United States Patent [19]

Rambold et al.

[11] 4,235,862
[45] Nov. 25, 1980

[54] PRODUCTION OF LOW SULPHUR CHROMIUM (III) OXIDE

[75] Inventors: Wolfgang Rambold; Heinrich Heine; Bruno Raederscheidt; Gerhard Trenczek, all of Krefeld, Fed. Rep. of Germany

[73] Assignee: Bayer Aktiengesellschaft, Leverkusen, Fed. Rep. of Germany

[21] Appl. No.: 968,588

[22] Filed: Dec. 11, 1978

Related U.S. Application Data

[63] Continuation-in-part of Ser. No. 817,080, Jul. 18, 1977, abandoned.

[30] Foreign Application Priority Data

Aug. 4, 1976 [DE] Fed. Rep. of Germany ....... 2635086

[51] Int. Cl.$^3$ ............................................. C01G 37/033
[52] U.S. Cl. ..................................... 423/607; 106/302
[58] Field of Search ......................... 423/607; 106/302

[56] References Cited

U.S. PATENT DOCUMENTS

| 1,429,912 | 9/1922 | d'Adrian | 423/607 |
| 2,921,838 | 1/1960 | Melville | 423/607 |
| 4,040,860 | 8/1977 | Mansmann et al. | 423/607 |
| 4,052,225 | 10/1977 | Mansmann et al. | 423/607 |
| 4,067,747 | 1/1978 | Mansmann et al. | 106/302 |

FOREIGN PATENT DOCUMENTS

| 728233 | 11/1942 | Fed. Rep. of Germany | 423/607 |
| 1038773 | 8/1966 | United Kingdom | 423/607 |

Primary Examiner—Herbert T. Carter
Attorney, Agent, or Firm—Sprung, Felfe, Horn, Lynch & Kramer

[57] ABSTRACT

A process for the production of low sulphur chromium-(III) oxide comprising annealing at a calcining temperature from about 800° C. to 1100° C. a mixture of alkali metal chromate and about 0.7 to 0.96 times its molar amount of ammonium sulfate, and separating the chromium(III) oxide formed from the alkali metal salt. Advantageously the ammonium sulfate in the form of a concentrated solution is mixed with solid alkali metal dichromate and the mixture thereafter is adjusted prior to calcination to a water concentration of less than about 15% by weight of water.

4 Claims, No Drawings

PRODUCTION OF LOW SULPHUR CHROMIUM (III) OXIDE

This application is a continuation-in-part of application Ser. No. 817,080, filed July 18, 1977, now abandoned.

Numerous processes are known by which chromium-(III) oxide can be produced from hexavalent chromium compounds at elevated temperatures. The starting materials used for these processes are chromic acid anhydride, ammonium chromates or alkali metal chromates. The reaction may be carried out without using a reducing agent, for example in the case of thermal decomposition of pure chromic acid anhydride or pure ammonium mono- or di-chromate, or with the addition of a reducing agent. The known organic or inorganic reducing agents such as sawdust, molasses, cellulose waste liquors, acetylene, methane, sulfur and its compounds, phosphorus, carbon, hydrogen and the like are used for this purpose. However, only the processes using alkali metal chromates have achieved any measure of economic importance. For producing chromium(III) oxide with a low sulfur content, the known processes have hitherto always used starting materials containing as little sulfur as possible, including sulfur in the form of sulfates.

Sodium chromate, for example, can be reduced to chromium(III) oxide having a low sulfur content with generator gas at temperatures above 660° C. The generator gas preheated to a temperature of from 700° C. to 800° C. is reacted with hot sodium chromate solution in a spray tower. The reaction product is leached for some time and then annealed at 800° C. (J. G. Ryss, R. Mandel, Novosti Tekhniki, 1938, No. 21, 37-38).

According to U.S. Pat. No. 2,921,838, chromium(III) oxide is obtained by heating a mixture of sodium chromate or sodium dichromate with aluminum oxide or aluminum phosphate in the presence of hydrogen, carbon monoxide or hydrocarbons to temperatures from 1000° to 1200° F. According to a proposal in British Pat. No. 1,038,773, chromium(III) oxide having a low sulfur content and suitable for metallurgical purposes can be obtained from pure chromium(IV) compounds capable of thermal decomposition, such as chromic acid anhydride or ammonium dichromate. The disadvantage of this process is that the use of compounds which can be thermally decomposed increases the cost of the process because these chromium(VI) compounds must first be recovered by extensive processes from sodium mono- or di-chromate obtained as primary product in the extraction of chromium ores.

It has already been attempted to avoid the expensive operation of isolating ammonium dichromate and instead to heat a mixture of sodium dichromate and ammonium sulfate. According to U.S. Pat. No. 1,429,912, this is carried out by mixing 50 parts by weight of ammonium sulfate with 100 parts by weight of $Na_2Cr_2O_7$ and reacting the mixture at 400° C., if necessary with the addition of a small quantity of water. However, the product obtained is a greenish black chromium(III) oxide which has a high sulfur content and is difficult to filter.

The process according to German Patent No. 728,233, in which $Na_2Cr_2O_7 \cdot 2H_2O$ and ammonium sulfate are mixed in proportions of 70:30 and heated for several hours at temperatures from 700° C. to 800° C. also fails to yield a chromium(III) oxide having a low sulfur content.

When stoichiometric quantities of alkali metal chromates, e.g. sodium dichromate dihydrate, and finely ground ammonium sulfate are reacted together in accordance with the following equation

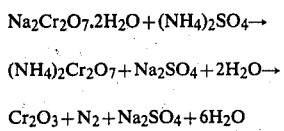

$$Na_2Cr_2O_7 \cdot 2H_2O + (NH_4)_2SO_4 \rightarrow$$

$$(NH_4)_2Cr_2O_7 + Na_2SO_4 + 2H_2O \rightarrow$$

$$Cr_2O_3 + N_2 + Na_2SO_4 + 6H_2O$$

a chromium(III) oxide having a sulfur content above 300 ppm is obtained after washing and drying.

It has now surprisingly been found that chromium oxide having a low sulfur content can be obtained under certain conditions even from reaction mixtures containing a high proportion of sulfates. The product has high valuable pigment properties.

The present invention thus provides a process for the production of low sulfur chromium(II) oxide by annealing a mixture of an alkali metal chromate and an ammonium salt and separating the resulting chromium(III) oxide from the resulting alkali metal salt, which process is characterized in that about 0.7 to 0.96 and preferably about 0.8 to 0.96 mol, of ammonium sulfate is used per mol of alkali metal chromate and the mixture is annealed at a calcining temperature from about 800° C. to 1100° C.

Chromium(VI) compounds used in the process according to the invention may be any of the group of alkali metal chromates consisting of sodium monochromates with any amount of water of crystallisation, sodium dichromate and sodium dichromate dihydrate. Sodium dichromate, particularly sodium dichromate dihydrate, and mixtures of sodium dichromates with up to 10% by weight of sodium monochromates, based on the amount of sodium dichromate, are preferred. The chromium (VI) compounds may be used in the solid form or as solution, and the ammonium sulfate may also be used in the form of a solution. In a preferred embodiment of the process according to the invention the monochromate content of the sodium dichromate or of the complete mixture of ammonium sulfate and sodium dichromate is adjusted by adding an alkaline reagent, e.g. alkali metal hydroxide or alkali metal carbonate, according to the reaction:

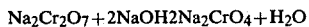

$$Na_2Cr_2O_7 + 2NaOH \rightarrow 2Na_2CrO_4 + H_2O$$

When solid alkali metal chromates containing water of crystallization are used for the process according to the invention, for example $Na_2Cr_2O_7 \cdot 2H_2O$ or $Na_2CrO_4 \cdot 4H_2O$, dry mixing of the chromium(VI) compound with ammonium sulphate must not be carried out so vigorously that water of crystallization is split off, because otherwise the mixture becomes sticky and lumpy in which state it is difficult to process. Suitable mixing apparatus both for solid starting materials and for solutions, include, for example, the known drum mixers, paddle screws, ploughshare mixers, high speed counterflow mixers, tumbling mills, dissolver discs and propeller stirrers and the like. In dry mixtures, the particle sizes of the starting materials used have an important influence of the sulphur contents of the chromium (III) oxides obtained after annealing, washing and drying. Commercial ammonium sulfate must be reduced at least to particle sizes below about 0.5 mm, and preferably below about 0.25 mm. The particle size of the solid alkali metal chromates used in the process is not so critical but should still be less than about 2 mm.

Further reduction of the sulfur content of chromium (III) oxide is possible by granulating or moistening the dry starting mixture with up to about 15% by weight, preferably about 0.2 to 8% by weight, of water, based on the mixture of alkali metal chromate and ammonium sulfate.

In another embodiment of the process according to the invention, the intimate mixture of alkali metal chromate and ammonium sulfate is obtained by mixing a concentrated aqueous solution of alkali metal chromate with about 4 to 30% less than the equivalent quantity of solid, finely milled ammonium sulfate, particularly with heating. The ammonium of the ammonium sulfate added is thereby virtually completely reacted in situ with the alkali metal chromate, i.e. to form ammonium chromate.

This ammonium chromate formed in situ is not isolated and is annealed at 800° C. to 1100° C. in the mixture with the alkali metal sulate formed and excess alkali metal chromate, e.g. sodium dichromate dihydrate, optionally after drying.

In this case, the particle size of the ammonium sulfate is again important and should be below about 0.5 mm, preferably below about 0.25 mm. If the particle size of the solid ammonium sulfate used in the process is significantly above about 1 mm, chromium(III) oxides with higher sulfur contents are produced.

It has proved to be suitable to use concentrations of aqueous sodium dichromate solutions of between about 1100 g and about 1600 g of $Na_2Cr_2O_7.2\ H_2O/l$ and to employ mixing temperatures of between about 30° C. and the boiling point of the mixture and mixing times of between about 10 minutes and 2 hours. If comparatively long heating times are employed, excess loss of water must be prevented by the usual methods such as the use of reflux condensers in order to keep the mixture in a stirrable state. When mixing is carried out under these conditions, the substance obtained within the given range of concentrations is a paste which flows easily when hot. This paste may either be transported straight to the furnace or it may be slightly cooled to a consistency ranging from a relatively stiff paste to solid cake, depending on its water content. The cake can then be broken up into lumps and transferred to the furnace in this form. If the concentration of sodium dichromate in the solution is initially at the lower end of the range, the solution may be concentrated to the desired water content by evaporation during the mixing process.

In another embodiment of the process according to the invention, intimate mixing of the components, alkali metal chromate and ammonium sulfate, can also be achieved by mixing an aqueous concentrated solution for example of sodium chromate, which has preferably been heated to temperatures up to its boiling point, with about 4 to 30% less than the equivalent quantity of an aqueous, concentrated ammonium sulfate solution and then drying the mixture, if possible at a temperature below about 150° C. Drying is preferably only continued to the stage where the mixture still contains up to about 15% by weight of water. If desired, a spray drier may be used for drying the solution mixture. The dry mixture may then be moistened with water if desired.

In accordance with the most preferred embodiment alkali metal chromates, e.g. solid sodium dichromate dihydrate or solid mixtures of sodium dichromates and sodium monochromates, can be dissolved at about 90° C. up to the boiling temperature in concentrated ammonium sulfate solutions containing about 0.7 to 0.96 times the molar amount of ammonium sulfate compared to the total molar amounts of chromates. Thereafter the solutions are evaporated to form solids having less than 15%, water, which are calcined.

Pumping of the solution undergoing evaporation sometimes creates problems due to encrustation on the apparatus walls of crystals of product and this may be avoided by a process modification. Specifically, the sodium chromates are dissolved in ammonium sulfate solution at about 15° C. to 45° C., forming a suspension of solid ammonium chromates in a solution of substantially sodium sulfate and sodium dichromate. This can be concentrated to less than 15% water for calcination without encrustation during pumping.

The ammonium sulfate solutions used for a process according to the invention are preferably highly concentrated, i.e. have a concentration of about 40% by weight, and may contain up to 10% by weight of additional ammonium sulfate in the solid form, based on the amount of the saturated ammonium sulfate solution.

The quantity of ammonium sulphate less than the equivalent quantity by 4 to 30% can, of course, be obtained in all embodiments of the process according to the invention by first intimately mixing stoichiometric quantities of an alkali metal chromate and ammonium sulfate. In this mixture, in which a substantial proportion of the ammonium sulfate has already been converted to the ammonium chromate compound, the ammonium sulfate content is then adjusted to less than 4–30% of the equivalent amount by the addition of appropriate quantities of alkali metal chromate, either in the solid form or as a solution.

By "from 4 to 30% less than the equivalent amount of ammonium sulfate" is meant that from 0.7 to 0.96 mol of ammonium sulfate is added to 1 mol of the sum of chromates in the mixture. The difference between the equivalent amount of ammonium sulfate and the amount actually used depends on the nature of the particular chromate compound, for example, when $Na_2Cr_2O_7.2\ H_2O$ is used, it is preferably about 20 to 11%, so that a maximum of from 0.9 to 0.945 mol of chromium(III) oxide and from 0.8 to 0.89 mol of sodium sulfate are obtained after annealing. When mixtures of dichromates with 10% by weight of monochromates are used the difference between the equivalent amount of ammonium sulfate and the amount actually used is preferably from 4 to 15%, so that a maximum of from 0.98 to 0.925 mol of chromium (III)oxide are obtained after annealing. This latter embodiment of the process according to the invention is preferred from an economical point of view, since higher yields of low sulfur chromium oxide are obtained.

Chromium(III) oxide having a low sulfur content can still be obtained when even smaller proportions of ammonium sulfate are used, but the yields, in terms of conversion rates, are then reduced to uneconomical levels.

Another advantage of the process according to the present invention is that the sulphur content in the chromium(III) oxide obtained after annealing, washing and drying is independent of the time spent heating up to the calcining temperature. A long heating time would be convenient from a technical point of view since, for example when a rotary furnace is used, the starting mixture could be fed in at the cold end and carried through the furnace in countercurrent to the firing gases. Accordingly, this method of heating is very econimical in energy consumption.

On the other hand, furnaces such as rotary plate furnaces or rotary ring furnaces (German Offenlegungsschrift No. 2,320,806) could be used, in which the mixture is heated to the calcining temperature within a few seconds or minutes.

For smaller quantities, muffle furnaces with sufficient thermal capacity could be used, in which the starting mixtures are introduced at the required calcining temperature.

By calcining temperature is meant a temperature range of from 800° C. to 1100° C., preferably about 900° C. to 1000° C. Annealing may, of course, also be carried out at temperatures above 1100° C., but this adds to the cost of the process unnecessarily since further temperature increase does not lead to a substantial reduction in the sulfur content of the chromium(III) oxide finally obtained.

In muffle furnaces, the required temperatures are obtained by use of electrical resistance heating elements, whereas in rotary plate furnaces, for example, they are obtained by employing additional gas firing, since the heat released by the exothermic formation of chromium(III) oxide from alkali metal chromates and ammonium sulfate is not sufficient to achieve the necessary temperatures.

Working up of chromium(III) oxide after annealing is carried out by conventional methods. Another advantage of the process according to the invention manifests itself at this stage of the process in that the annealed products rapidly separate in water and the soluble alkali metal sulfide rapidly goes into solution.

The wash water used for the final wash should be as free from sulfate as possible so that the residual moisture adhering to the washed chromium(III) oxide will not introduce additional sulfur in the form of sulfates into the low sulfur chromium(III) oxide which is to be dried.

The invention will be explained in more detail in the examples hereinbelow.

1 Mol of alkali metal chromate is generally used in the following experiments. The mixtures of alkali metal chromate and ammonium sulfate are spread out on flat quartsware dishes to a layer from 1 to 2 cm in height and placed in a muffle furnace which had been preheated to the annealing temperature (e.g. 980° C.). The mixture heats up to this temperature in about 10 minutes and is then kept at this temperature for the length of time indicated in the examples before the dishes are removed from the hot furance. After cooling, the annealed product is washed with a total of 5 liters of water and then dried at 120° C. The percentage conversion is determined in the first filtrate by titration of the chromium (VI) content still present.

Comparison Example A (German Patent No. 728,233)

70 parts by weight of $Na_2Cr_2O_7.2\ H_2O$ reduced to a particle size of less than 1.5 mm were mixed dry with 30 parts by weight of $(NH_4)_2SO_4$ reduced to a particle size of less than 1.0 mm. Annealing conditions: 6 hours at 750° C. Conversion: 96.5%. Sulfur content in $Cr_2O_3$: 1400 ppm.

Comparison Example B (German Patent No. 728,233)

The same as A only using $(NH_4)_2SO_4$ reduced to a particle size of less than 0.25 mm. Conversion: 96.6%. Sulfur content in $CR_2O_3$: 760 ppm.

Comparison Example C (U.S. Pat. No. 1,429,912)

100 parts by weight of $Na_2Cr_2O_7$ (spray dried, particle size less than 0.05 mm) were mixed dry with 50 parts of $(NH_4)_2SO_4$ and annealed at 400° C. for 70 minutes. Conversion: 98.5%. Sulfur content in $CrO_3$: 6370 ppm.

Comparison Example D

1 Mol of sodium dichromate dihydrate was mixed dry with 1 mol of ammonium sulfate (particle size less than 0.25 mm), moistened with 8 g of water and annealed at 950° C. for 60 minutes. Conversion: 98.5%. Sulfur content in $Cr_2O_3$: 330 ppm.

EXAMPLE 1

1 Mol of sodium dichromate dihydrate was mixed in the dry state with 0.88 mol of ammonium sulfate (particle size less than 1 mm) and annealed at 980° C. for 90 minutes. Conversion: 93.5% Sulfur content in $Cr_2O_3$: 50 ppm.

EXAMPLE 2

The same procedure as in Example 1 was employed except that the mixture was moistened with 2% of water. Conversion: 93.4%. Sulfur content in $Cr_2O_3$: 60 ppm.

EXAMPLE 3

1 Mol of sodium dichromate dihydrate was mixed in the dry state with 0.85 mol of ammonium sulfate (particle size less than 0.25 mm), moistened with 2% of water and annealed at 970° C. for 80 minutes. Conversion: 91.2%. Sulfur content in $Cr_2O_3$: 50 ppm.

EXAMPLE 4

5 Mols of sodium dichromate dihydrate were mixed in the dry state with 4.0 mols of ammonium sulfate (particle size less than 0.5 mm) in a drum, moistened with 3% of water and annealed at 980° C. for 2 hours. Conversion: 89%. Sulfur content in $Cr_2O_3$: 30 ppm.

EXAMPLE 5

1 Mol of $Na_2Cr_2O_7.2\ H_2O$ was stirred to form a paste with 0.8 mol of ammonium sulfate (particle size less than 0.25 mm) and 8% of water at 60° C. and annealed at 950° C. for 70 minutes. Conversion: 89.6%. Sulfur content in $Cr_2O_3$: 40 ppm.

EXAMPLE 6

400 g of a 64.5% sodium dichromate solution were mixed cold with 280 g of a 40% ammonium sulfate solution and evaporated at a water content of about 8% by weight at from 95° C. to 100° C. with stirring. The paste which solifified on cooling was annealed at 970° C. for 80 minutes. Conversion: 92.5%. Sulfur content in $Cr_2O_3$: 40 ppm.

EXAMPLE 7

118 g of ammonium sulfate (below 0.25 mm) and 15% by weight of water were added to 268 g of $Na_2Cr_2O_7$ (97.5%) and the mixture was stirred hot. The solidified paste obtained on cooling was annealed at 970° C. for 80 minutes. Conversion: 94.0%. Sulfur content in $Cr_2O_3$: 50 ppm.

Comparison Example E

1 Mol of $Na_2Cr_2O_7.2H_2O$ was mixed in the dry state with 0.88 mol of $(NH_4)_2SO_4$, moistened with 1.5% of water and annealed at 600° C. for 2 hours. Conversion: 92.3%. Sulfur content in $Cr_2O_3$: 370 ppm.

EXAMPLE 8

The same procedure as described in Comparison Example E was employed except that in this case annealing was carried out at 950° C. Conversion: 92.4%. Sulfur content in $Cr_2O_3$: 60 ppm.

EXAMPLE 9

The same procedure as described in Comparison Example E was employed except that annealing was carried out at 1000° C. Conversion: 92.0%. Sulfur content in $Cr_2O_3$: 40 ppm.

EXAMPLE 10

The same procedure as described in Comparison Example E was employed except that annealing was carried out at 950° C. for 90 minutes. Conversion: 93.5%. Sulfur content in $Cr_2O_3$: 60 ppm.

Comparison Example F

The same procedure as described in Comparison Example E was employed except that annealing was carried out at 950° C. for 15 minutes. Conversion: 93.5%. Sulfur content in $Cr_2O_3$: 160 ppm.

Example 11

1 Mol of $Na_2Cr_2O_7.2 H_2O$ in the form of a 60% aqueous solution was mixed with 0.8 mol of $(NH_4)_2SO_4$ in the form of a 40% solution and evaporated to a water content of 8% by weight with stirring. The paste which solidified on cooling was then heated to 980° C. for 90 minutes and annealed at this temperature for a further 70 minutes. Conversion: 89.8%. Sulfur content in $Cr_2O_3$: 30 ppm.

Example 12

In 281 g of 40% by weight of ammonium sulfate solution there are dissolved 300 g of solid sodium dichromate dihydrate at 105° C. The resulting solution is evaporated down to a water content of 7% and the product annealed at 970° C. for 70 minutes to give a low sulfur chromium oxide. Coversion: 92,5% . Sulfur content: 40 ppm.

EXAMPLE 13

To avoid some encrustations on the apparatus resulting in Example 12, in 1.4 kg of 40% by weight ammonium sulfate solution there are dissolved 1.5 kg sodium dichromate dihydrate at 30° C. The resulting suspension of solid ammonium dichromate in a solution of sodium sulfate and sodium dichromate is stirred for 60 minutes. Thereafter the suspension can be pumped without encrustation and evaporated and calcined as in Example 12 to give low sulfur chromium oxide. Conversion: 92%. Sulfur content in $Cr_2O_3$: 30 ppm.

EXAMPLE 14

In 323 g of 40% by weight ammonium sulfate solution there are successively dissolved 300 g of solid $Na_2Cr_2O_7 . 2H_2O$ and 11.7 g of solid $Na_2CrO_4 . 4H_2O$ at 30° C. The resulting suspension is stirred for 60 minutes and thereafter evaporated and calcined as in Example 12 to give low sulfur chromium oxide. Conversion: 96%. Sulfur content in $Cr_2O_3$: 70 ppm.

EXAMPLE 15

In 330 g of 40% by weight ammonium sulfate solution there are dissolved 300 g of solid sodium dichromate dihydrate at 105° C. Thereafter 0.1 mol of sodium hydroxide in form of a 20% by weight aqueous solution is added and the resulting solution is stirred thoroughly. The further procedure was performed as in Example 12. Conversion: 97%. Sulfur content in $Cr_2O_3$:30 ppm.

EXAMPLE 16

To 297 g of 40% by weight ammonium sulfate solution are added successively 26.4 g of solid ammonium sulfate and 364 g of sodium dichromate dihydrate at 30° C. After stirring for 60 minutes the suspension is evaporated and calcined as in Example 12 to give low sulfur chromium oxide. Conversion: 95%. Sulfur content in $Cr_2O_3$:70 ppm.

It will be appreciated that the instant specification and examples are set forth by way of illustration and not limitation, and that various modifications and changes may be made without departing from the spirit and scope of the present invention.

What is claimed is:

1. A process for the production of low sulphur chromium(III) oxide comprising adding solid alkali metal dichromate to a concentrated ammonium sulfate solution at a temperature of about 15° to 45° C., the ammonium sulfate being present in about 0.7 to 0.96 times the molar amount of the chromate, adjusting the mixture to a water concentration of less than about 15% by weight of water, and calcining at a temperature of about 800° to 1100° C.

2. A process according to claim 1, wherein the concentrated ammonium sulfate solution additionally contains up to 10% by weight of solid ammonium sulfate.

3. A process according to claim 1, wherein up to about 10 weight % alkali metal monochromate, based on alkali metal dichromate, are added to the mixture prior to the adjustment of the water content of the mixture.

4. A process according to claim 3, wherein up to about 3.0 weight % of a member selected from the group consisting of alkali metal hydroxide and alkali metal carbonate, based on alkali metal dichromate, is added to the mixture prior to the adjustment of the water content of the mixture, thereby adjusting the monochromate content of the mixture.

* * * * *